(12) United States Patent
Reuter

(10) Patent No.: US 6,788,416 B2
(45) Date of Patent: Sep. 7, 2004

(54) METHOD AND APPARATUS FOR DYNAMIC DMD TESTING

(75) Inventor: Fred J. Reuter, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 286 days.

(21) Appl. No.: 10/153,006

(22) Filed: May 22, 2002

(65) Prior Publication Data

US 2003/0218753 A1 Nov. 27, 2003

(51) Int. Cl.[7] .............................................. G01N 21/55
(52) U.S. Cl. ...................................................... 356/445
(58) Field of Search .................................. 356/445–448, 356/237.1–237.5, 239.1–239; 250/458.1, 459.1, 461.1, 461.2

(56) References Cited

U.S. PATENT DOCUMENTS

| | | | |
|---|---|---|---|
| 6,567,163 B1 * | 5/2003 | Sandstrom ................... | 356/317 |
| 2002/0031783 A1 * | 3/2002 | Empedocles et al. ........ | 435/7.1 |
| 2002/0057431 A1 * | 5/2002 | Fateley et al. .............. | 356/330 |

OTHER PUBLICATIONS

Paek, High–speed temporal characterization and visualization of spatial light modulators and flat–panel displays, Optics Letters, Apr. 1, 1998, vol. 23, No. 7, Information Technology Laboratory, National Institute of Standards and Technology, Gaithersburg, Maryland.

* cited by examiner

Primary Examiner—Michael P. Stafira
(74) Attorney, Agent, or Firm—Charles A. Brill; Wade James Brady, III; Frederick J. Telecky, Jr.

(57) ABSTRACT

A method and apparatus for measuring the transient behavior characteristics of individual micromirrors in a DMD micromirror array. The method and system use sampling techniques to measure an amount of light reflected by an individual micromirror as the entire micromirror array is stimulated with a pattern of alternating driving signals. Sampling is achieved by illuminating the DMD micromirror array with a high-speed illumination source that provides stroboscopic light flashes of very short time length. By synchronizing the light flashes with the mirror driving signal and measuring the amount of light reflected by the individual micromirrors at different points in time, the transient behavior characteristics of individual micromirrors in a DMD micromirror array can be measured with a high level of accuracy.

31 Claims, 7 Drawing Sheets

METHOD AND APPARATUS FOR DYNAMIC DMD TESTING

BACKGROUND

Micromechanical devices are small structures typically fabricated on a semiconductor wafer using techniques such as optical lithography, doping, metal sputtering, oxide deposition, and plasma etching similar to those developed for the fabrication of integrated circuits. Digital micromirror devices (DMDs), sometimes referred to as deformable micromirror devices, are a type of micromechanical device. Other types of micromechanical devices include accelerometers, pressure and flow sensors, gears and motors.

Digital micromirror devices have been utilized in optical display systems. In these display systems, the DMD is a light modulator that uses digital image data to modulate a beam of light by selectively reflecting portions of the beam of light to a display screen. While analog modes of operation are possible, DMDs typically operate in a digital bistable mode of operation and as such are the core of many digital full-color image projection systems.

Micromirrors have evolved rapidly over the past ten to fifteen years. Early devices used a deformable reflective membrane that, when electrostatically attracted to an underlying address electrode, dimpled toward the address electrode. Schieren optics illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer tended to deform over a large region, however, which scattered light impinging on the deformed portion. Thin hinge structures, which restrict the deformation to a relatively small region of the device, limit the amount of light scattered and improve image quality.

Torsion beam devices enabled the use of dark field optical systems. Torsion beam devices use a thin metal layer to form a torsion beam, which is referred to as a hinge, and a thicker metal layer to form a rigid member, or beam, typically having a mirror-like surface. The rigid member or mirror is suspended by, and typically centered on, the torsion hinge-allowing the mirror to rotate by twisting the torsion hinge. Address electrodes are formed on the substrate beneath the mirror on either side of the torsion hinge axis. Electrostatic attraction between an address electrode and the mirror, which in effect form the two plates of an air gap capacitor, is used to rotate the mirror.

Recent micromirror configurations, called hidden-hinge designs, further improve the image contrast ratio by using an elevated mirror to block most of the light from reaching the torsion beam hinges. The elevated mirror is connected to an underlying torsion beam or yoke by a support post. The yoke is attached to the torsion hinges, which in turn are connected to rigid support posts. Because the structures that support the mirror and allow it to rotate are underneath the mirror instead of around the perimeter of the mirror, virtually the entire surface of the device is used to fabricate the mirror. Since virtually all of the light incident to a hidden-hinge micromirror device reaches an active mirror surface—and is thus either used to form an image pixel or reflected away from the image to a light trap—the hidden-hinge device's contrast ratio is much higher than the contrast ratio of previous devices.

Images are created by positioning the DMD so that a light beam strikes the DMD at an angle equal to twice the angle of rotation. In this position, the mirrors fully rotated toward the light source reflect light in a direction normal to the surface of the micromirror device and into the aperture of a projection lens-transmitting light to a pixel on the image plane. Mirrors rotated away from the light source reflect light away from the projection lens-leaving the corresponding pixel dark.

Full-color images are generated either by using three micromirror devices to produce three single-color images, or by sequentially forming three single-color images using a single micromirror device illuminated by a beam of light passing through three color filters mounted on a rotating color wheel.

An example of a small portion of a digital micromirror array is depicted in FIG. 1. In FIG. 1, a small portion of a digital micromirror array 100 with several mirrors 102 is depicted. Some of the mirrors 102 have been removed to show the underlying structure of the DMD array. FIG. 2 is an exploded close-up of one individual mirror 102 of a DMD array. The electrical interconnections and operations of the individual micromirrors 102 are described in further detail in U.S. Pat. No. 6,323,982 entitled Yield Superstructure for Digital Micromirror Device to Larry J. Hornbeck, which is hereby incorporated by reference.

A representative embodiment of an existing DMD testing apparatus is depicted in FIG. 3. In FIG. 3, an incandescent light 305 provides light that is captured by a set of focusing optics 310. The focusing optics 310 focus the captured light so as to create a substantially uniform and collimated set of light beams 315. The light beams 315 are directed to the DMD device under test (DUT) so as to create a reflected set of light beams 325. The reflected light beams 325 may be directed to a reflector screen 330 so that the reflected patterns of light generated by the DMD device under test 320 may be viewed by a person. According to this embodiment, a pattern generator 335 is connected to the DMD device under test 320 so that a variety of patterns may be applied to the micro mirrors on the DMD device under test 320. By using these patterns, different characteristics of the DMD device under test 320 may be analyzed.

One problem associated with existing DMD testing apparatuses 300 is that they can only identify problems on a macroscopic scale. In other words, the system depicted in FIG. 3 can only be used to detect problems that are visible to the naked eye, such as twinkle or stuck pixels. Another problem associated with existing DMD testing apparatuses 300 is that the incandescent light source 105 cannot be switched on and off at high speed, thus limiting its effectiveness in measuring the transient response of a DMD device under test 320. Yet another problem associated with existing DMD testing apparatuses 300 is that the light generated by the incandescent light source 305 is not coherent and is polychromatic. This can create focusing and interference problems for the focusing optics 310 and for the DMD device under test 320.

There is therefore a need in the art for an improved DMD testing apparatus that can characterize the transient behavior of individual mirrors in a DMD device under test. There is also a need for a testing apparatus that utilizes a high-speed monochromatic light source so that stroboscopic bursts of monochromatic light can be applied to the DMD device under test. There is also a further need for a device and method that can produce quantifiable data corresponding to the transient behavioral characteristics of individual micromirrors in a DMD array in a very short period of time.

BRIEF SUMMARY

Each individual mirror in an DMD micromirror array can be modeled as behaving in a deterministic manner. In other words, each time a mirror is stimulated by a particular set of signals, the mirror will behave in the same manner. This being the case, if the DMD array is driven with a periodic set of signals, each mirror in the DMD array will react with a periodic response. Each individual mirror in a DMD array, however, may have a unique response.

Because each mirror can be made to behave in a periodic manner, the measurements of the transient effects exhibited by individual micromirrors can be made using sampling techniques. Thus, by using a modulated, uniform illumination of a DMD array, a carefully controlled optical sensor, such as a CCD frame-transfer mode still-camera, and periodic activation of the DMD array, it is possible to measure the transient characteristics of hundreds of thousands of DMD micromirrors in just a few seconds. There are two algorithms that can be used with the disclosed system: a slow flash method and a fast flash method. The slow flash method is used to identify, at a high level, specific micromirrors on a DMD array that are exhibiting abnormal transient behavior. Because the slow flash method does not make precise measurements of the transient behavior characteristics of the micromirrors, it is most often used as a go/no-go test to confirm the operability of individual micromirrors. The fast flash method uses sampling techniques to make precise measurements of the transient behavior characteristics of the micromirrors. Both of these methods have advantages over existing methods because they can both be performed within a few seconds and because they produce quantifiable data describing the behavior of the individual micromirrors. This data is useful for behavior analysis, statistical analysis, and to eliminate the process of manually verifying the operability of a DMD micromirror array by a person.

DETAILED DESCRIPTION

Figure 1:
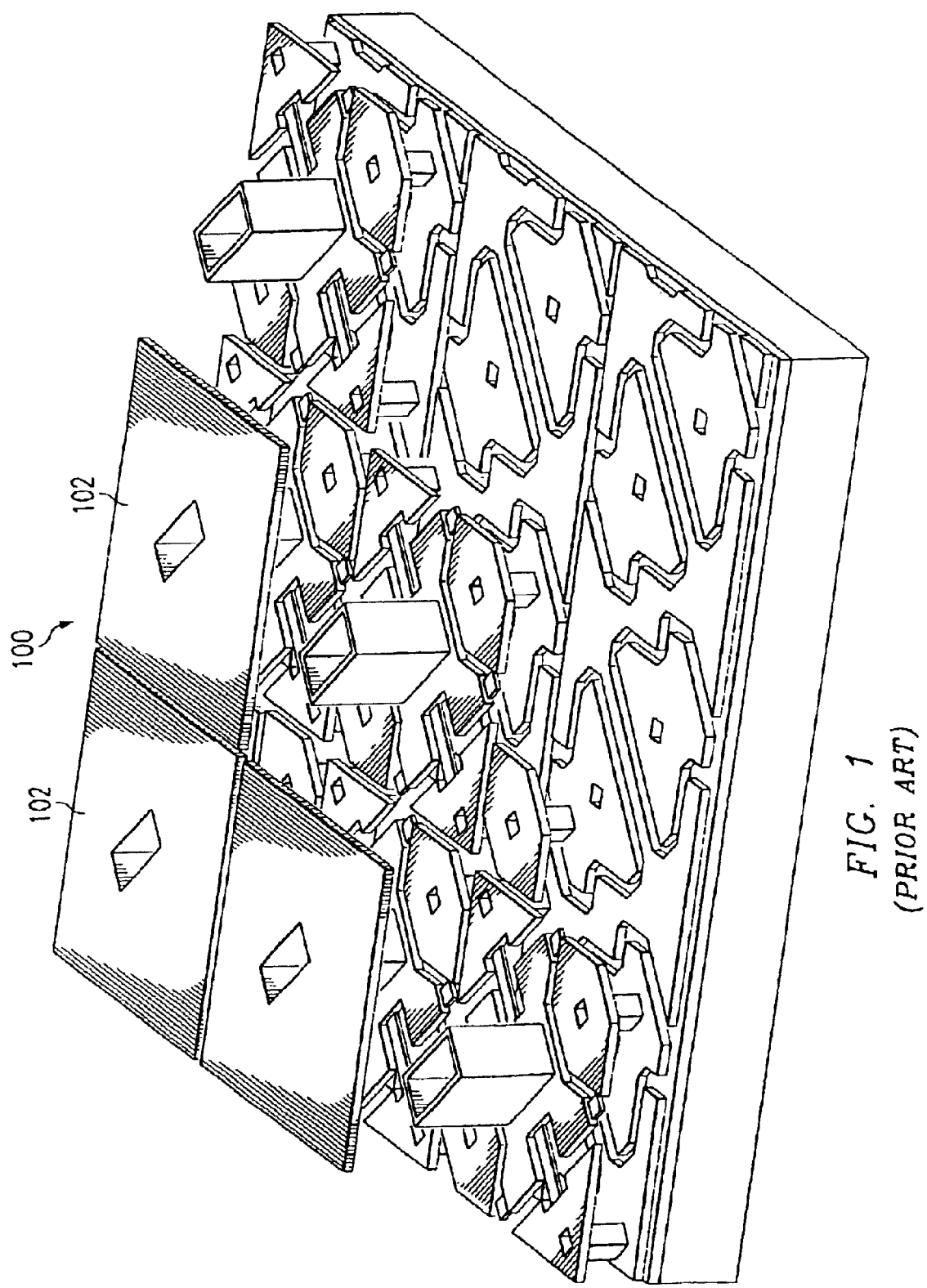
FIG. 1 is a perspective view of a portion of a micromirror array with some of the micromirrors removed.
Figure 2:
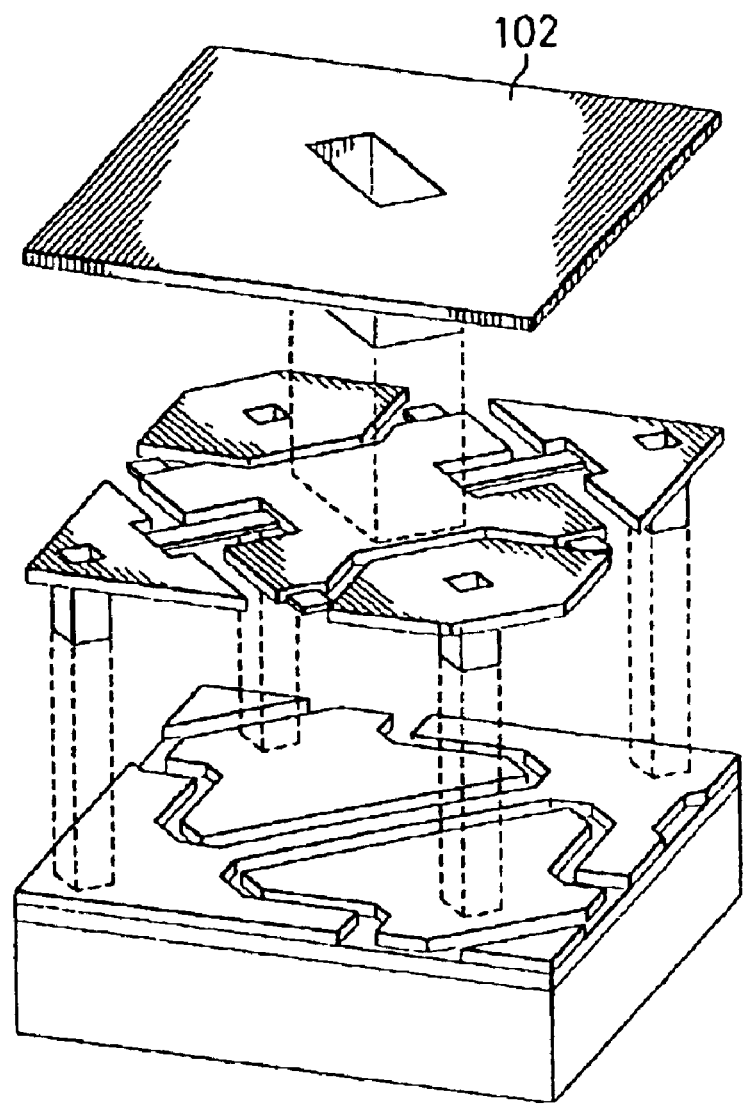
FIG. 2 is an exploded perspective view of a single micromirror assembly.
Figure 3:
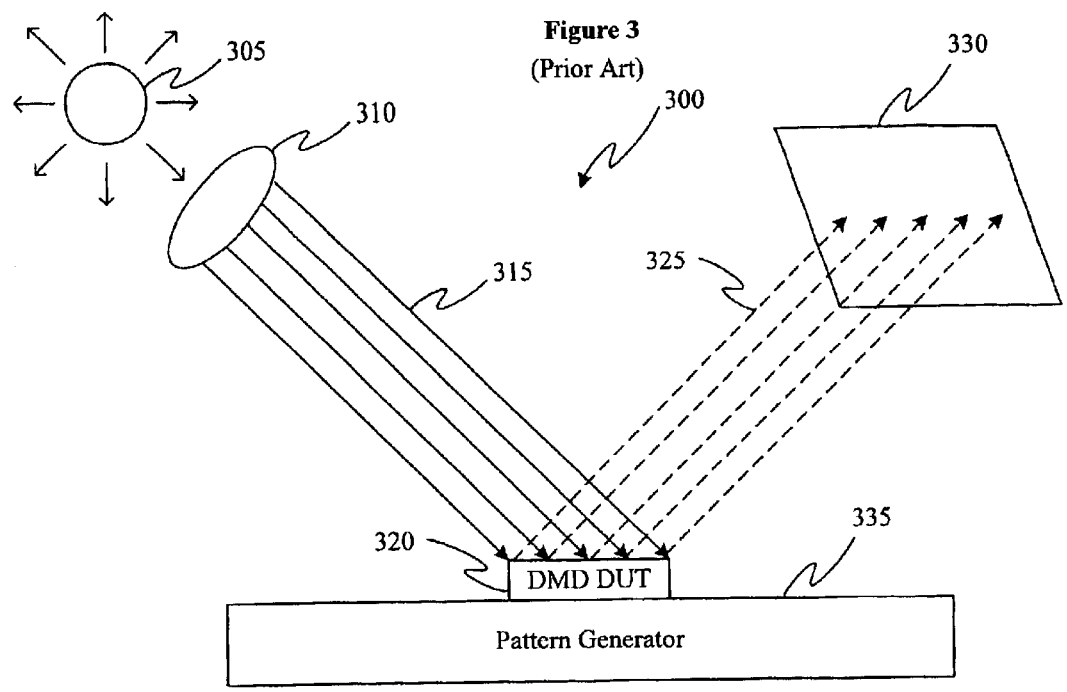
FIG. 3 is a block diagram of an existing DMD testing apparatus.
Figure 4:
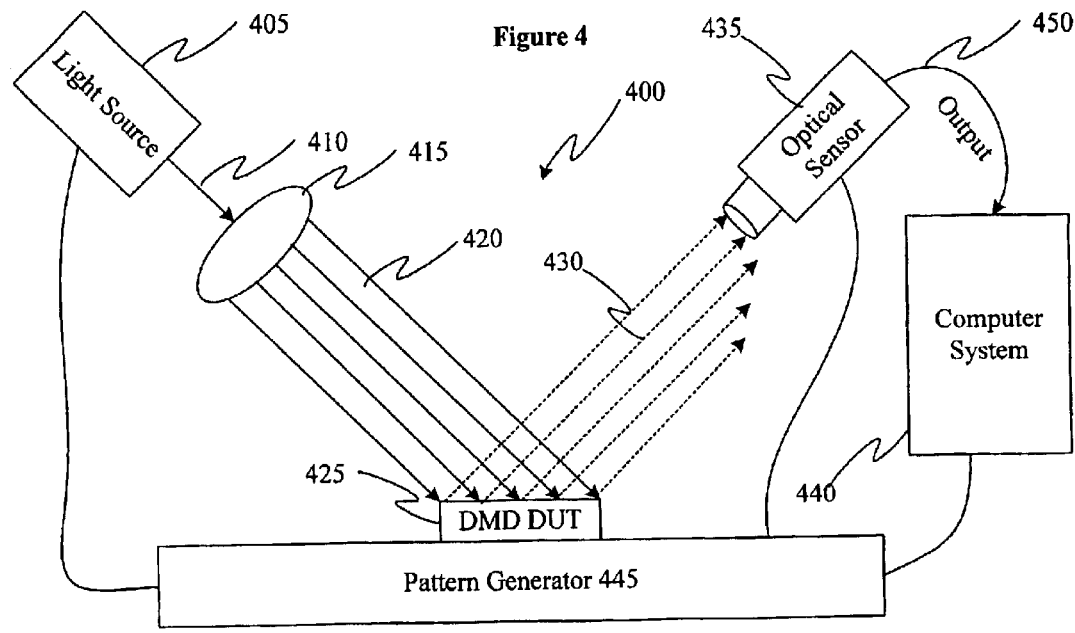
FIG. 4 is a block diagram of a DMD testing apparatus consistent with a disclosed embodiment of the invention.

An improved DMD testing apparatus 400 is depicted in FIG. 4. In FIG. 4, a high-speed monochromatic light source 405 is used to generate a beam of monochromatic light 410. The light source 405 should be capable of being switched on and off electronically at high speeds, preferably faster than 200 ns. The radiation wavelength of the light source 405 should be in the range of visible light, preferably in the range of 450–900 nm. However, other ranges may be acceptable depending upon the reflectivity of the DMD micromirror array and the sensitivity of the integrating optical sensor 435. The output power level of the light source 405 should be in the range of 0.1–100 milliwatts, with a preferred range of 1–10 milliwatts. One family of devices that is suitable for use as a high-speed light source 405 is a vertical cavity surface emitting laser (VCSEL) diode. More specifically, a Honeywell® HFE409x-332 VCSEL diode has been found to be suitable for use with this system.

The beam of monochromatic light 410 generated by the light source 405 passes through a set of focusing optics 415 so that a uniform set of light beams 420 is directed to the DMD device under test (DUT) 425. According to one embodiment, the focusing optics 415 may comprise a set of culminating optics. According to another embodiment, the intensity of the light is uniform across the entire width of the beam 420. Although coherency of the light beams 420 is not required, a narrow wavelength is preferred to provide for simplicity of the optics design. As the light beams 420 are applied to the DMD device under test 425, a set of reflected light beams 430 is generated by the micromirrors in the DMD device 425. An integrating optical sensor 435 is arranged to collect these reflected light beams 430. The optical sensor 435 may collect all of the reflected light beams 430, or only a portion thereof. According to one embodiment, the optical sensor 435 captures as much of the DMD array as possible while still over-sampling the DMD surface with several sensor pixels per DMD micromirror. According to another embodiment, the optical sensor 435 comprises a still CCD camera that has the capability to frame capture and frame dump images. This arrangement is preferred over a rasterizing video camera for accuracy purposes. The optical sensor 435 should be capable of a two-dimensional broad side transfer of CCD image pixels to a holding memory within a few clock operations. This feature is preferred because it allows all of the CCD image pixels to record images over the exact same period of time. Another preferred feature of a CCD camera is the precise control over exposure time, or shutter speed. According to one embodiment, a Texas Instruments TC281 CCD image sensor has been found to be an acceptable optical sensor 435 for use with this system.

The output 450 of the integrating optical sensor 435 is provided to a computer system 440. The computer system 440 should be capable of performing digital signal processing calculations. More specifically, the computer system 440 should be adapted to perform array processing and mathematical domain transformations. In addition to collecting the output 450 of the optical sensor, the computer system 440 can be used to provide driving signals (i.e. driving patterns) to a pattern generator 445.

The pattern generator 445 is connected to the DMD device under test 425 so that certain patterns may be displayed on the micromirror array of the DMD device. These patterns may include switching patterns wherein all of the mirrors in the micromirror array are periodically switched between the on and off position. According to one embodiment, the pattern generator 445 should be able to write a pattern and the inverse of that pattern to the DMD array as fast as the DMD can accept the pattern. Assuming that the transient behavior of a micromirror is significantly complete in 100 μs, then the pattern generator should be capable of loading a new pattern in as close to that time as possible. The patterns that are utilized in this system may include herring-bone patterns, checkerboard patterns, or other predetermined patterns for measuring specific characteristics of the DMD device under test 425. Pseudo-random patterns are also useful because they have a spatial frequency content consistent with video signals, a common application for DMD arrays. By utilizing different patterns, and adjusting the length of the light signals provided by the light source 405, many of the transient characteristics of the DMD device under test can be accurately measured. Furthermore, by focusing the integrating optical sensor 435 on an specific portion of the DMD device under test 425, the performance characteristics of specific mirrors on the DMD device under test 425 can be oversampled and measured with a greater level of accuracy. According to one embodiment, each micromirror in the DMD device under test 425 is oversampled with sixteen pixels from the optical sensor 435. According to another embodiment, the pattern generator comprises a movable stage that can translate the DMD device under test 225 so that different portions of the DMD array can be illuminated and measured by the disclosed system.

Figure 5A:
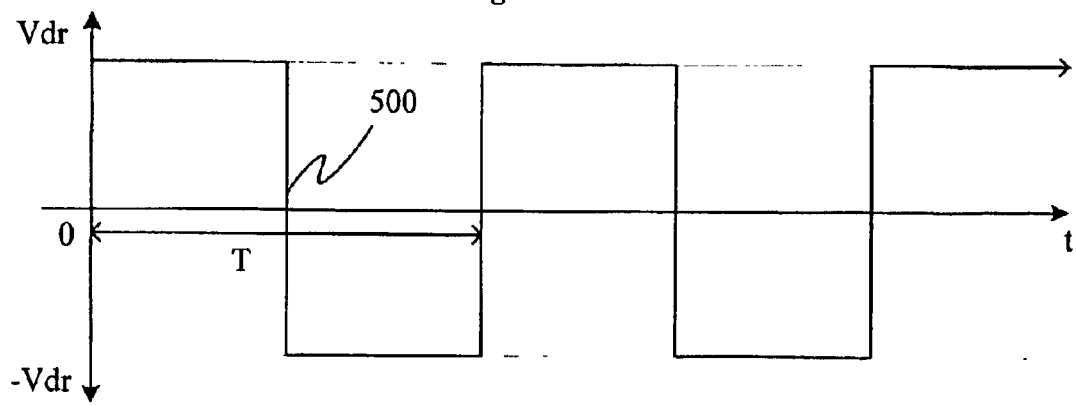
FIG. 5A is a diagram of a representative square-wave driving voltage signal used to periodically activate an individual mirror in a DMD array.
Figure 5B:
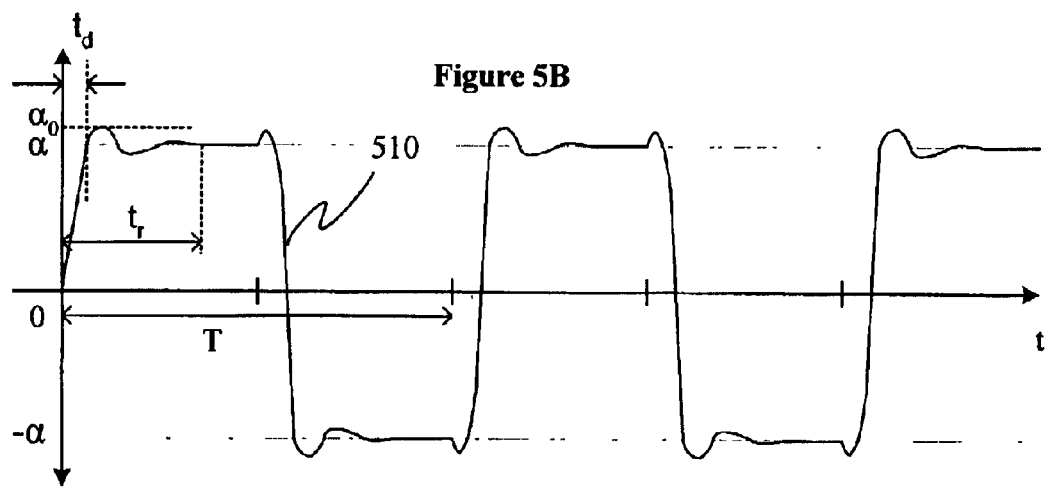
FIG. 5B is a diagram of a response of a representative micromirror in a DMD array being driven by the square-wave voltage signal of FIG. 5A.
Figure 5C:
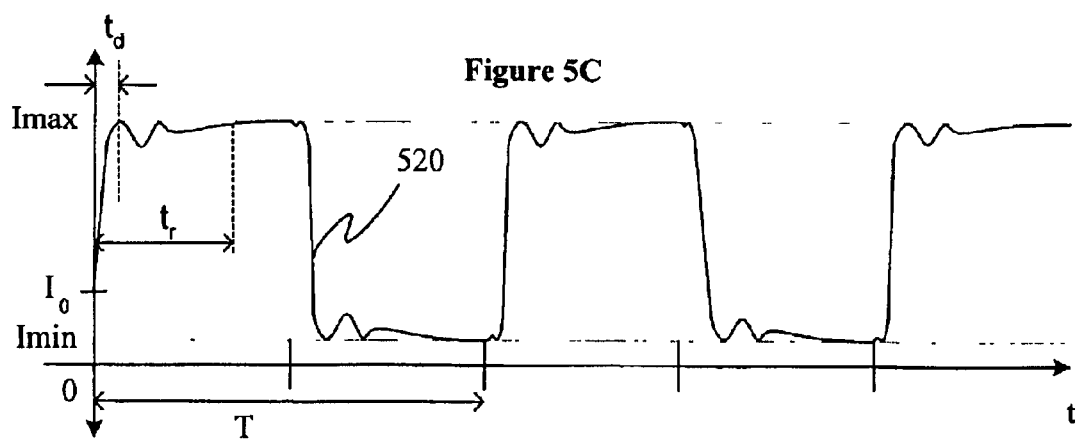
FIG. 5C is a diagram of the intensity of the reflected light generated by a representative micromirror in a DMD array being driven by the square-wave voltage signal of FIG. 5A.

A representative set of some of the signals provided to and generated by the improved DMD testing apparatus is depicted in FIGS. 5A, 5B and 5C. In FIG. 5A, a square wave driving voltage signal 500 is depicted that alternates between a positive voltage $V_{dr}$ and negative voltage $-V_{dr}$. This signal represents the driving voltage presented to a single micromirror that is being alternately switched on and off. As can be seen in FIG. 5A, the on/off signal repeats itself every T seconds.

The response of a micromirror that is being driven with the driving voltage of FIG. 5A is illustrated in FIG. 5B. Much like the driving signal of FIG. 5A, the micromirror response 510 of FIG. 5B has a response that repeats every T seconds. Because the micromirror is mounted on a hinge that comprises a mechanical system, it possesses many of the characteristics common to any mechanical system, such as ring, overshoot, and response time. Each of these characteristics are depicted in FIG. 5B. For example, when a driving voltage $V_{dr}$ is applied to the mirror, a certain period of time $t_d$ elapses before the mirror actually reaches the desire angle α. Furthermore, as the mirror reaches this desire angle α, its momentum will cause the mirror to slightly overshoot the desired angle α to a new angle $α_0$. This is commonly known in the art as overshoot. After this, the micromirror will resonate, or ring, until it settles at the desired angle α. The time required for the micromirror to settle at the desired angle α is known as the ring time $t_r$, which is also depicted in FIG. 5B. Although these three transient characteristics are illustrated in FIG. 5B, it will be apparent to one of ordinary skill in the art that many other transient characteristics are inherent to a mechanical system and would therefore be present in FIG. 5B. Because the operation of the micromirror is determinative, each of these transient characteristics are present every time the mirror is driven to a new angle by the driving voltage Vdr. Accordingly, each mirror in the micromirror array of a DMD will exhibit certain transient response characteristics based upon either the mechanical structure of the mirror or upon other imperfections or flaws that are the result of manufacturing defects. Although some of these transient characteristics are inherent to the micromirror structure and are therefore expected, many transient characteristics are undesirable and can result in the scrapping or rework of a DMD device. It is therefore highly desirable to specifically identify the transient characteristics of all of the micromirrors in the DMD array so that important manufacturing decisions can be made regarding the characterized DMD array.

Although the individual mirror angles and their transient characteristics are depicted in FIG. 5B, these characteristics are very difficult to measure directly. As a result, the transient characteristics are most often measured by monitoring the light reflected from an individual mirror and analyzing the characteristics of the reflected light. FIG. 5C depicts the response 520 of a representative micromirror in a DMD array as it is illuminated with a uniform beam of light and driven by square-wave signal from a pattern generator, such as the signal depicted in FIG. 5A. In FIG. 5C, the amount of light I reflected by the micromirror alternates between a maximum $I_{max}$ and a minimum $I_{min}$ every T/2 seconds. The system may be configured such that the maximum amount of light $I_{max}$ reflected by the micromirror corresponds to the angle α at which the micromirror is located when a driving voltage Vdr is applied to the micromirror. Similarly, a minimum amount of light $I_{min}$ corresponds to a tilt angle −α when a negative driving voltage −Vdr is applied to the micromirror. These concepts are illustrated in FIG. 5C. Also depicted in FIG. 5C is a default value of reflected light $I_0$ that corresponds to an amount of light reflected by the mirror when it is at resting position (α=0). The transient effects of the micromirror device manifest themselves in the amount of light reflected by the micromirror as it is moved from an on position to an off position and vice versa. More specifically, it can be seen that the rise time $t_d$ manifests itself as the time required for the intensity of the light to reach its maximum ($I_{max}$). Furthermore, the ring time of the micromirror $t_r$ is determined by the amount of time it takes for the intensity of the reflected light to come to rest at its maximum. Thus, by measuring the intensity of light reflected by an individual micromirror, the transient characteristics of the micromirror can be measured and quantified with a high level of accuracy.

Existing DMD testing apparatuses have had difficulty measuring the transient characteristics of individual micromirrors on a DMD array. This is true for several reasons. First, the time scale on which these transient characteristics manifest themselves is often on the order of microseconds or less. Second, the intensity of light reflected by an individual micromirror or by a small section of a micromirror array is very small. According, highly sensitive optical sensors are necessary in order to make accurate measurements of the amounts of reflective light. The disclosed method and system can overcome many of these difficulties by using different arrangements and algorithms to process the light reflected by the micromirrors.

Slow Flash Embodiment

Figure 6A:
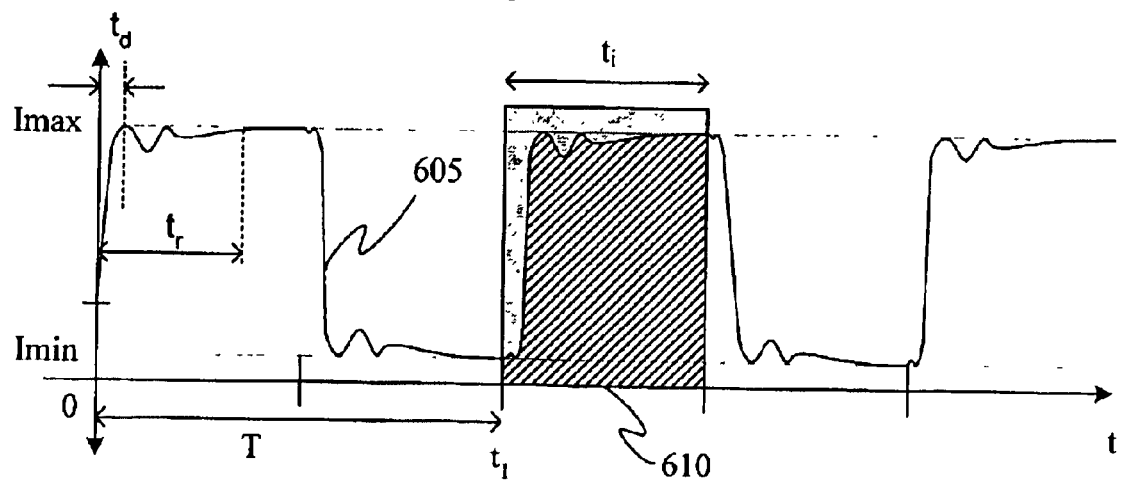
FIG. 6A is a diagram depicting the application of a slow flash measurement process to a representative micromirror being driven by a square-wave signal.
Figure 6B:
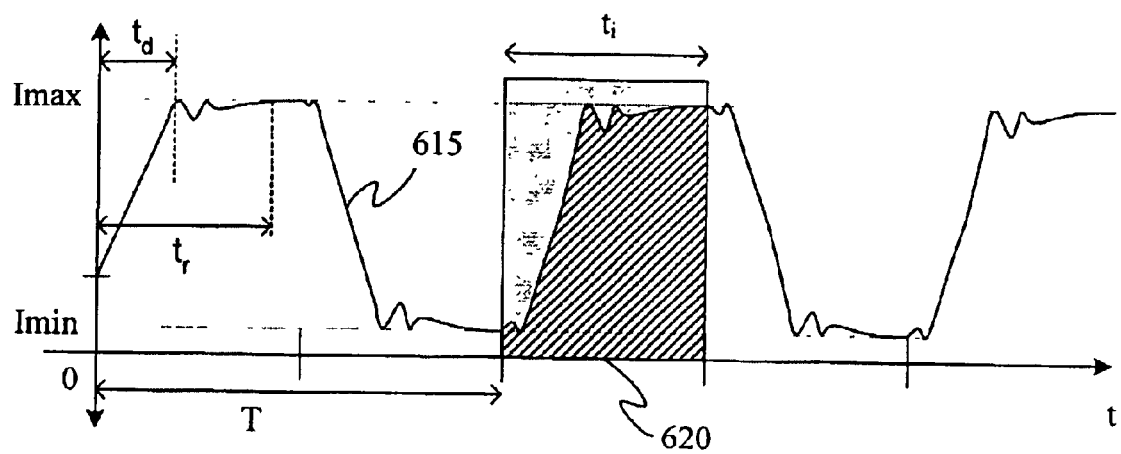
FIG. 6B is a diagram depicting the application of a slow flash measurement process to a representative defective micromirror being driven by a square-wave signal.

One method for characterizing the transient response of an individual micromirror on a DMD array is depicted in FIGS. 6A & 6B. In FIG. 6A, the response 605 of an individual micromirror that being driven with a square wave driving voltage $V_{dr}$ is depicted. As the micromirror is illuminated, the amount of light I reflected by the mirror will follow a generally square pattern 605 that includes transient characteristics. As the DMD device under test is driven by the square wave pattern, the integrating optical sensor 435 detects the light reflected by the micromirror. The optical sensor 435 may be focused on a specific micromirror in the DMD array, or it may be focused on a small region on the micromirror array. According to yet another embodiment, the optical sensor can monitor all of the micromirrors in a micromirror array at the same time. According to the slow flash embodiment, at a specific point in time, $t_1$, the high-speed light source 405 will be illuminated for a period of time $t_1$. This period of time $t_i$ will usually be one half of the period T of the driving voltage signal. Furthermore, the beginning of the period of time $t_i$ is usually synchronized to commence at the same time that a new cycle of the driving signal commences. All of these timing and synchronization functions can be driven by the patterns loaded into the pattern generator 445.

Assuming that the entire pattern load time for a DMD is approximately 200 μs, the light source 405 may be configured to deliver a single, low energy 200 μs flash that starts at the beginning of a DMD driving cycle. Because the light source 405 illuminates the micromirror for only a portion of one cycle of the driving signal, the integrating optical sensor 435 will only measure the amount of light reflected by that mirror during this period. This amount of light corresponds to the cross-hatched region 610 depicted in FIG. 6A. By accurately measuring this amount of light, a rough measure of the transient characteristics can be performed. More specifically, a large amount of collected light will indicate that the micromirror is emulating the performance of the square-wave driving voltage and is therefore functioning properly. On the other hand, a lesser amount of collected light can indicate that the micromirror is not functioning properly and therefore should be investigated further. This concept is further described below.

A representative response curve 615 for a defective micromirror is depicted in FIG. 6B. In FIG. 6B, the amount of light 615 reflected by a micromirror generally follows the periodic pattern of a square wave. The response curve 615, however, has a much greater time delay $t_d$ than the curve depicted in FIG. 6A. This generally means that the mirror is taking a long time to reach its desired tilt-angle α. Thus, when the micromirror is illuminated with light during the time period $t_i$, it will reflect less light because it takes longer for the micromirror to reach its angle of maximum reflection $α_{max}$. The total amount of light reflected by the micromirror over the period of time $t_i$ is represented in FIG. 6B by the cross-hatched region 620. A comparison of cross-hatched region 620 with the cross-hatched region 610 of FIG. 6A demonstrates that much less light is indeed reflected. Thus, by making measurements of the amount of light reflected by an individual micromirror, the computer system 440 can determine that whether an individual micromirror is defective without obtaining precise measurements of the transient characteristics of the micromirror. It should be noted that this method of measuring the amount of light reflected by an individual micromirror may be used to detect many other problems, such as, an inoperable hinge, a deformed mirror surface, or a stuck micromirror. Because this method detects problems on a high level only, it is most useful as a go/no-go test to confirm the operation of a micromirror. It is also contemplated that this same test could be performed during an off cycle of the micromirror. In this manner, a lower level of reflected light, rather than a higher level, would indicate a problem with a micromirror. It is also contemplated that the slow flash method can be performed on an entire DMD micromirror array so that a go/no-go test can be completed within a few seconds. This offers a significant improvement in both time and accuracy over existing go/no-go tests.

Fast Flash Embodiment

One problem associated with making measurements of the transient characteristics of a micromirror is the short time frame in which these transient characteristics manifest themselves. Many of the transient characteristics of a micromirror, such as rise time $t_d$, overshoot, and ring time $t_r$, are measured in microseconds, or sometimes even shorter time periods. This problem is particularly difficult because many optical sensors 435 are not sensitive enough to make accurate measurements of light reflected from micromirror with a shutter speed on the order of a few microseconds or less. To overcome this problem, the shutter of an optical sensor 435 is left open for several periods T of the driving signal while the high-speed light source 405 provides several timed stroboscopic light bursts for very short periods of time. These stroboscopic bursts may be in the range of 10 to 1,000 nano seconds, but are preferably about 100 nano seconds. Assuming that the DMD micromirror natural frequency is on the order of 1 MHz, the light source 405 should be configured to flash for approximately 300 ns at a fixed delay from the DMD reset event at the beginning of an alternating pair of patterns. Moreover, the exposure time for the optical sensor should last long enough to permit the capture of a few tens of cycles of the driving signal. According to one embodiment, this exposure time should last for approximately 30 ms.

These stroboscopic bursts from the light source 205 are synchronized with the pattern generating signal so that the bursts illuminate the micromirror at exactly the same time during the driving cycle. Because the optical sensor 435 is an integrating sensor, it will therefore measure the total amount of light reflected by the micromirror during these short time periods over several cycles. Thus, by dividing the total amount of light collected by the optical sensor 435 by the number of cycles during which it was exposed, an amount of light reflected by the micromirror over a very brief period of time can be determined. This concept is illustrated in FIGS. 7A–7C.

Figure 7A:
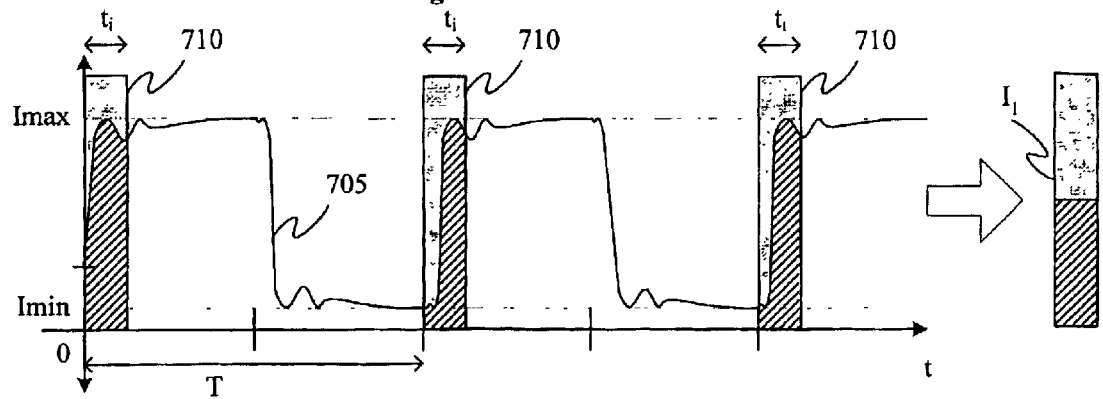
FIG. 7A is a diagram depicting the application of a fast flash measurement process to a representative micromirror being driven by a square-wave signal.
Figure 7B:
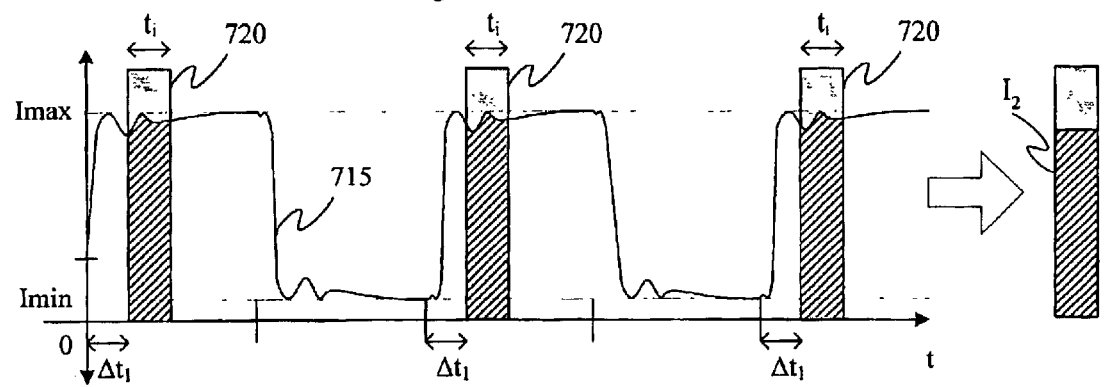
FIG. 7B is a diagram depicting another aspect of a fast flash measurement process as it is applied to a representative micromirror being driven by a square-wave driving voltage signal.
Figure 7C:
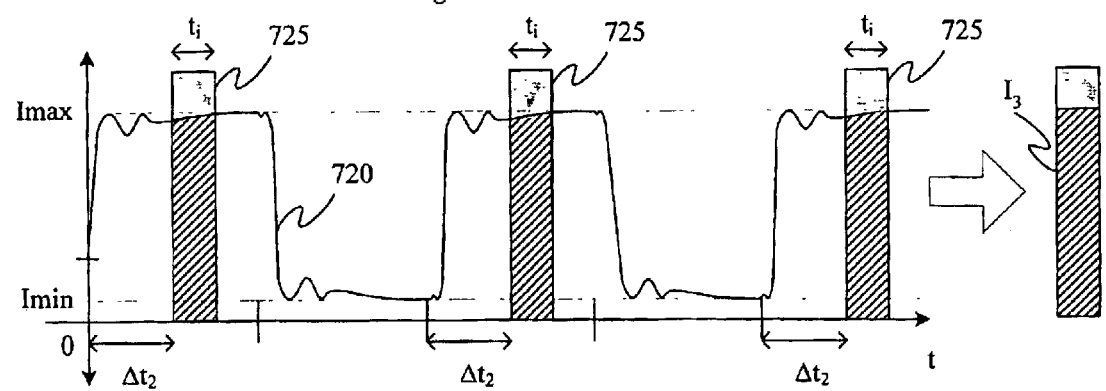
FIG. 7C is a diagram depicting yet another aspect of a fast flash measurement process as it is applied to a representative micromirror being driven by a square-wave signal.

In FIG. 7A, a response curve 705 of an individual micromirror that being driven with a square wave driving voltage $V_{dr}$ is depicted. At the beginning of each cycle of the driving signal, a stroboscopic flash 710 is generated by the high-speed light source 405 for a brief period of time $t_i$. This period of time $t_i$ may be as short as 10 nano seconds, but is more often in the range of 100 to 1,000 nano seconds. While these stroboscopic flashes 710 are occurring, the shutter of the optical sensor 435 remains open to collect the light reflected by the micromirror. The amount of light reflected by the micromirror during each of these flashes 710 is depicted in FIG. 7A by the cross-hatched area under the response curve 705. After several cycles of the driving signal, the integrating optical sensor 435 has measured sufficient light to make an accurate measurement of the amount light reflected by the micromirror during the first period of time $t_i$. These measurements can be performed with as few as 5 cycles of the driving signal, but is more often measured using a range of 10 to 1,000 cycles. After these measurements are complete, the computer system 440 divides the total amount of light collected by the number of cycles that the optical sensor shutter was open to determine the total amount of light $I_1$ reflected by the micromirror during each stroboscopic flash 710.

This process is repeated over a series of time periods until the entire driving signal has been characterized. Two representative measurements of this process are depicted in FIGS. 7B & 7C. In FIG. 7B, a response 715 of an individual micromirror that being driven with a square wave driving voltage $V_{dr}$ is depicted. Much like FIG. 7A, a stroboscopic flash 720 is generated by the high-speed light source 405 for a brief period of time $t_1$. Unlike FIG. 7A, however, the stroboscopic flash 720 is delayed by a period of time $\Delta t_1$ from the beginning of the driving signal cycle. The delay time $\Delta t_1$ will usually correspond to a multiple of the time period of the stroboscopic flash $t_i$. By collecting the total amount of light reflected by the micromirror and dividing this amount by the number of driving cycles that were measured, the total amount of light $I_2$ reflected by the micromirror during each stroboscopic flash 720 can be calculated. This process is repeated in FIG. 7C, except that a longer delay $\Delta_2$ is used before the stroboscopic flash is generated. Accordingly, after performing the measurements depicted in FIG. 7C, the total amount of light $I_3$ reflected by the micromirror during each stroboscopic flash 725 can be calculated.

Figure 8:
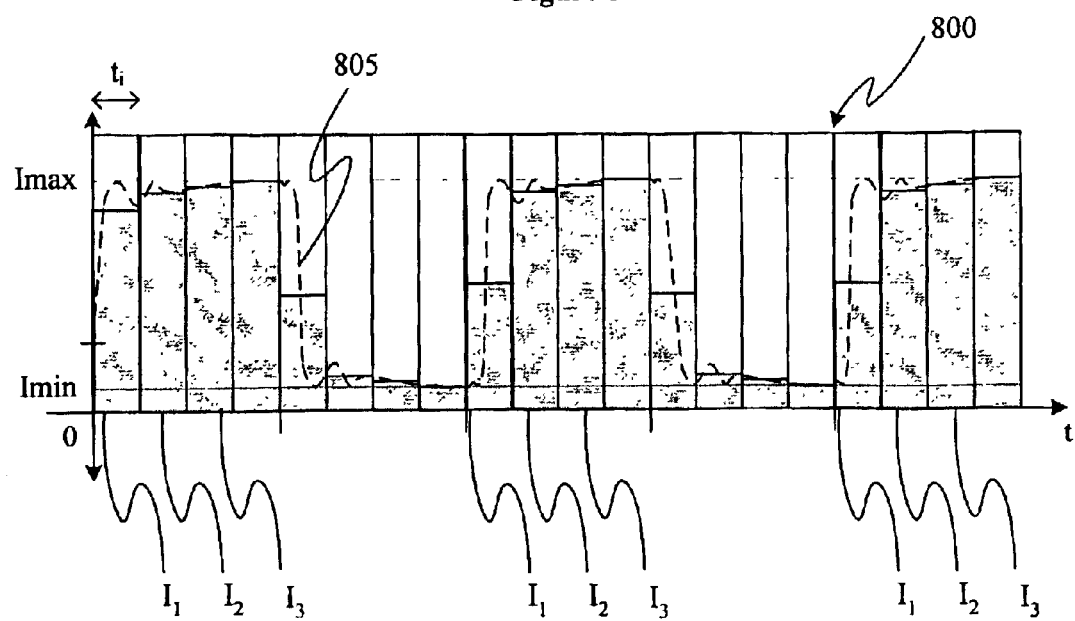
FIG. 8 is a representative diagram depicting a sum of the calculations performed by a fast flash measurement process.

After a series of measurements have been made over the entire period of the driving signal, a complete model 800 of the transient response of the micromirror has been generated. A representative example of this model is depicted in FIG. 8. In FIG. 8, each of the measured amounts of light (i.e. $I_1$, $I_2$, $I_3$, etc.) been placed adjacent to each other so that the transient response characteristics of the micromirror can be viewed and analyzed. A trace of the actual response of the micromirror 805 has been superimposed on the model in FIG. 8 to illustrate the accuracy of the model. The accuracy of the model can be increased by shortening the illumination time $t_i$ so that shorter and shorter time periods can be modeled. Eventually, however, the accuracy of these measurements is limited by the inability of the high-speed light source 405 to provide infinitesimally small bursts of light and the inability of the optical sensor 435 to measure infinitesimally small amounts of reflected light. Thus, by analyzing the data presented in FIG. 8, a user or a computer system can measure many of the transient response characteristics of the micromirror, such as, for example, rise time $t_d$, overshoot, and ring time $t_r$.

Although certain embodiments and aspects of the present inventions have been illustrated in the accompanying drawings and described in the foregoing detailed description, it will be understood that the inventions are not limited to the embodiments disclosed, but are capable of numerous rearrangements, modifications and substitutions without departing from the spirit of the invention as set forth and defined by the following claims and equivalents thereof. Applicant intends that the claims shall not invoke the application of 35 U.S.C § 112, ¶6 unless the claim is explicitly written in means-plus-function or step-plus-function format.

The following is claimed:

1. A method of measuring the dynamic behavior of a DMD micromirror residing in a DMD micromirror array, the method comprising:

providing a high-speed illumination source adapted to illuminate at least a portion of a DMD micromirror array;

providing an integrating optical sensor adapted to measure light reflected by a DMD micromirror array;

providing a DMD pattern generator;

electrically connecting a DMD micromirror array to the DMD pattern generator;

applying an alternating pattern of driving signals to the DMD micromirror array at a first periodic rate;

illuminating the DMD micromirror array with at least one light flash that is synchronized with the alternating pattern of driving signals; and measuring an amount of light reflected from the DMD micromirror array over a first period of time with the integrating optical sensor, wherein the first period of time comprises at least one complete cycle of the alternating pattern of driving signals.

2. A method according to claim 1, wherein the high-speed illumination source comprises a VCSEL diode.

3. A method according to claim 1, wherein the integrating optical sensor comprises a frame transfer mode CCD camera.

4. A method according to claim 1, wherein the alternating pattern of driving signals comprises a checkerboard pattern.

5. A method according to claim 1, wherein the alternating pattern of driving signals comprises a herringbone pattern.

6. A method according to claim 1, wherein measuring an amount of light reflected from the DMD micromirror array further comprises:

oversampling a portion of the DMD micromirror array with the integrating optical sensor.

7. A method according to claim 6, wherein each micromirror in the oversampled portion of the DMD micromirror array is oversampled sixteen times.

8. A method according to claim 1 wherein the at least one light flash commences at about the same time as the commencement of a new cycle of the driving signal.

9. A method of measuring the dynamic behavior of a DMD micromirror residing in a DMD micromirror array, the method comprising:

providing a high-speed illumination source adapted to illuminate at least a portion of a DMD micromirror array;

providing an integrating optical sensor adapted to measure light reflected by a DMD micromirror array;

providing a DMD pattern generator comprising a movable stage for mounting a DMD micromirror array;

electrically connecting a DMD micromirror array to the DMD pattern generator;

applying an alternating pattern of inversely related driving signals to the DMD micromirror array at a first periodic rate;

illuminating the DMD micromirror array with a stroboscopic light flash lasting for a period of time that is about one half of the period of the driving signal, wherein the commencement of the light flash is synchronized with the commencement of a cycle of the alternating pattern of driving signals; and measuring an amount of light reflected from the DMD micromirror array over a first period of time with the integrating optical sensor, wherein the first period of time comprises at least one complete cycle of the alternating pattern of driving signals.

10. A method according to claim 9, wherein the high-speed illumination source comprises a VCSEL diode.

11. A method according to claim 9, wherein the integrating optical sensor comprises a frame transfer mode CCD camera.

12. A method according to claim 9, wherein the alternating pattern of driving signals comprises a checkerboard pattern.

13. A method according to claim 9, wherein the alternating pattern of driving signals comprises a herringbone pattern.

14. A method according to claim 9, wherein measuring an amount of light reflected from the DMD micromirror array further comprises:
oversampling a portion of the DMD micromirror array with the integrating optical sensor.

15. A method according to claim 14, wherein each micromirror in the oversampled portion of the DMD micromirror array is oversampled sixteen times.

16. A method according to claim 9 further comprising identifying a set of functional micromirrors based upon the amount of light reflected by the respective micromirrors during the light flash.

17. A method of measuring the dynamic behavior of a DMD micromirror residing in a DMD micromirror array, the method comprising:
providing a high-speed illumination source adapted to illuminate at least a portion of a DMD micromirror array;
providing an integrating optical sensor adapted to measure light reflected by a DMD micromirror array;
providing a DMD pattern generator comprising a movable stage for mounting a DMD micromirror array;
electrically connecting a DMD micromirror array to the DMD pattern generator;
applying an alternating pattern of inversely related driving signals to the DMD micromirror array at a first periodic rate;
illuminating the DMD micromirror array with a plurality of stroboscopic light flashes, wherein each of the stroboscopic light flashes lasts for a period of time that is less than half the period of the driving signal, and wherein the commencement of each of the light flashes is synchronized with the driving signal; and
measuring an amount of light reflected from the DMD micromirror array over a first period of time with the integrating optical sensor, wherein the first period of time comprises at least five periods of the driving signal.

18. A method according to claim 17, wherein the stroboscopic flashes last for a period of time in the range of about 10 nanoseconds to about 1,000 nanoseconds.

19. A method according to claim 17, wherein the first period of time comprises a period of time less than about 1000 periods of the driving signal.

20. A method according to claim 17, wherein the high-speed illumination source comprises a VCSEL diode.

21. A method according to claim 17, wherein the integrating optical sensor comprises a frame transfer mode CCD camera.

22. A method according to claim 17, wherein the alternating pattern of driving signals comprises a checkerboard pattern.

23. A method according to claim 17, wherein the alternating pattern of driving signals comprises a herringbone pattern.

24. A method according to claim 17, wherein measuring an amount of light reflected from the DMD micromirror array further comprises oversampling a portion of the DMD micromirror array with the integrating optical sensor.

25. A method according to claim 24, wherein each micromirror in the oversampled portion of the DMD micromirror array is oversampled sixteen times.

26. A method according to claim 17, further comprising dividing the amount of light measured by the number of stroboscopic flashes applied to the DMD micromirror array during the first period of time.

27. A method according to claim 17 further comprising:
identifying a set of functional micromirrors based upon the amount of light reflected by the respective micromirrors during the stroboscopic light flashes.

28. A method according to claim 17, further comprising:
repeating a) through c) until an entire period of a driving signal has been characterized:
a) illuminating the DMD micromirror array with a plurality of stroboscopic light flashes, wherein each of the stroboscopic light flashes lasts for a period of time that is less than half the period of the driving signal, and wherein each of the light flashes is commenced after a delay time has expired after the commencement of a cycle of the driving signal;
b) measuring an amount of light reflected from the DMD micromirror array over a first period of time with the integrating optical sensor, wherein the first period of time comprises at least five periods of the driving signal; and
c) increasing the delay time for the commencement of the light flashes.

29. A system adapted for measuring the dynamic behavior of a DMD micromirror residing in a DMD micromirror array, the system comprising:
a high-speed illumination source adapted to illuminate at least a portion of a DMD micromirror array;
an integrating optical sensor adapted to measure light reflected by a DMD micromirror array;
a DMD pattern generator electrically connected to the illumination source and the optical sensor;
wherein the DMD pattern generator is adapted to apply an alternating pattern of driving signals to a DMD micromirror array that is mounted on the pattern generator at a first periodic rate;
wherein the illumination source is adapted to illuminate the DMD micromirror array with at least one light flash that is synchronized with the alternating pattern of driving signals; and
wherein the optical sensor is adapted to measure an amount of light reflected from the DMD micromirror array over a first period of time, wherein the first period of time comprises at least one complete cycle of the alternating pattern of driving signals.

30. A system according to claim 29, wherein the high-speed illumination source comprises a VCSEL diode.

31. A system according to claim 29, wherein the integrating optical sensor comprises a frame transfer mode CCD camera.

* * * * *